United States Patent [19]
Danisch

[11] Patent Number: 6,127,672
[45] Date of Patent: Oct. 3, 2000

[54] TOPOLOGICAL AND MOTION MEASURING TOOL

[75] Inventor: Lee Danisch, Fredericton, Canada

[73] Assignee: Canadian Space Agency, Canada

[21] Appl. No.: 08/863,063

[22] Filed: May 23, 1997

[51] Int. Cl.[7] ....................................................... G01J 1/04
[52] U.S. Cl. ................................ 250/227.14; 250/227.16; 600/595; 128/782
[58] Field of Search .......................... 250/227.14, 227.11, 250/227.16, 227.24, 227.28, 221, 224; 73/655; 341/20, 31; 600/595; 128/782; 340/555, 556, 557

[56] References Cited

U.S. PATENT DOCUMENTS

| | | | |
|---|---|---|---|
| 4,570,065 | 2/1986 | Pryor | 250/201 R |
| 4,932,444 | 6/1990 | Zimmerman | 250/231.1 |
| 5,038,618 | 8/1991 | Malvern | 73/800 |
| 5,097,252 | 3/1992 | Harvill et al. | 340/540 |
| 5,184,009 | 2/1993 | Wright et al. | 250/227.11 |
| 5,316,017 | 5/1994 | Edwards et al. | 600/595 |
| 5,665,922 | 9/1997 | Tsukada et al. | |
| 5,676,157 | 10/1997 | Kramer | 600/595 |
| 5,715,834 | 2/1998 | Bergamasco et al. | 600/595 |
| 5,813,406 | 9/1998 | Kramer et al. | 600/595 |
| 5,831,260 | 11/1998 | Hansen | 250/221 |

FOREIGN PATENT DOCUMENTS

| | | |
|---|---|---|
| 344 322 | 12/1989 | European Pat. Off. . |
| 615 110 | 9/1994 | European Pat. Off. . |
| 42 40 531 | 2/1994 | Germany . |
| 2 238 112 | 5/1991 | United Kingdom . |
| WO 94 29671 | 12/1994 | WIPO . |

OTHER PUBLICATIONS

Rolf H. Eppinger, On the Development of a Deformation Measurement System and its Application . . . Proceedings of 33rd Stapp Car Crash Conference, Washington, D.C. pp. 21–28, Oct., 4–6, 1998.

*Primary Examiner*—Que T. Le
*Assistant Examiner*—Thanh X. Luu
*Attorney, Agent, or Firm*—David J. French

[57] ABSTRACT

A position, orientation, shape and motion measuring tool is provided in the form of a flexible substrate with bend and twist sensors distributed along its surface at known intervals. A ribbon-type substrate is preferred. The geometric configuration of the substrate is calculated from inter-referencing the locations and orientations of the sensors based upon the detected bend and twist values. Suitable applications include motion capture for humans for use in animation, six degree of freedom input to a computer, profile measurement and location tracking within a large, singularity-free working space.

20 Claims, 11 Drawing Sheets

A-A

B-B

TOPOLOGICAL AND MOTION MEASURING TOOL

FIELD OF THE INVENTION

This invention relates to sensor technology. In particular, the invention relates to measuring the geometric location and configurations of objects in space. The invention is suited to robotic applications and to extracting human geometry and motion.

A preferred application is in the field of animation effected by motion capture of movements by the human body.

BACKGROUND TO THE INVENTION

Various technologies have been applied to measure the location, orientation and surface shapes of objects in space.

In the field of robotics it is known to determine the location of a series of rigid, linked elements in space by measuring the angular degree of rotation existing at the various joints joining such linked elements, cf U.S. Pat. No. 5,576,727 to Rosenberg et al.

In the field of interfaces between humans and mechanisms, gonimeters based upon rotary potentiometers or strain gauges are used to measure the angular relationships between parts of the human body, cf, U.S. Pat. No. 5,163,228 to Edwards et al.

U.S. Pat. No. 4,988,981 (Thomas Zimmerman et al) reveals means for sensing body position using flex sensors, including the use of flex sensors carried by a glove. Such gloves have been widely used and reported on. Reported problems include ambiguity of response due to finger motion occurring in multiple degrees of freedom, and other inaccuracies due to fit of the glove to the hand. Similar methods of providing flex sensing in a glove are reported in U.S. Pat. No. 5,097,252 (Y. L. Harvill et al).

Slidable linkage flex sensors designed to sense two degrees of freedom of finger joint motion have been described in U.S. Pat. No. 5,316,017 (Glenn Edwards et al). The slidable linkage permits the sensor to accommodate for the changing distance between attachment points during flexure.

U.S. Pat. No. 5,533,531 (Glenn Edwards et al) addresses separating and identifying motions having multiple degrees of freedom (DOFs) using a multi-DOF contacting sensor: the DOFs are exercised separately in a calibration routine, which provides a mathematical relationship between the outputs of the sensors responding to detected motions which can be used to provide separate DOF signals. A similar method is advanced in U.S. Pat. No. 5,531,257 (Danisch), in which three fiber optic sensors mounted in parallel with their sensing surfaces splayed in separate directions are used for resolving bends in multiple DOFs in a flexing structure. However, neither reference suggests methods of dealing with twist, which would cause ambiguity or be undetectable in the readings of either of the patented sensor methods. Nor does either patent deal with the problem of determining the complete position and orientation of a longitudinally extended structure based only on measurement of flexure.

Rotations in a flexure include bending that is transverse to the longitudinal extent of the substrate; and twisting that occurs about an axis which is coincident with the longitudinal extent of the substrate. Both types of bending quality as "flexures".

Twist is usually negligible in sensor structures based on cylinders, rods, and other solids with significant cross-sectional dimensions. However, it can be very advantageous to measure the presence of twist in flat, ribbon-like flexures. Such flexures are very convenient for incorporation in garments.

Viral Technologies Inc. of Palo Alto Calif. markets an instrumented fabric glove which incorporates bend sensors at the finger joints and other sensors for measuring thumb cross-over, palm arch, wrist flexion and wrist adjunction. The position of the glove and its sensors in space is also measurable by coupling the glove wristband to a 6 degrees-of-freedom space-position tracking mechanism.

An instrumented glove marketed by General Reality Company of San Jose Calif. relies upon fiber optic bend sensors to sense bending at various points on the glove.

In the field of animation motion capture, procedures are used to record the positions and movements of the human body. One method has involved visually capturing the locations in space of "target" markers carried on the limbs and bodies of human actors. Another methods has been to provide an "exoskeleton" mechanical structure which acts as a mechanism in following, and providing signals for recording, the motions and positions assumed by the human body. Accuracy is then limited by the ability of the exoskeleton to maintain a stable mounting to the body. The penalty of such systems is the constricting and cumbersome nature of mechanical exoskeletons. Also, it is very difficult, if not impossible, to build exoskeletons that permit full limb movement or that can account for all limb rotations and other subtle multiple degree of freedom limb movements. Further, exoskeletons are generally removed a significant distance from the measured surface, leading to their inaccuracy and increased bulk.

Both of the target marker and exoskeleton methods as presently conceived are complex and entail inconveniences in their implementation. A need exists for a light weight, unencumbering, position and motion sensing device that can conveniently track and identify the location and geometric configuration of objects in space. The invention herein addresses such an objective.

More particularly an object of the present invention is to provide a flexural reference platform equipped with distributed sensors wherein changes in the shape of the platform are sensed by the sensors in such a way that the complete shape of the platform can be found by calculations from the outputs of the sensors.

Another object of this invention is to provide an instrumented, flexible member that is sufficiently compliant to substantially conform to the surface of a curved object and act as a sensor to provide electronically processable data as to the shape of that surface.

A variety of technologies exist for measuring the state of flexure—bend and twist—in an object. A convenient class of technology particularly suited to this objective relies on fiber optics.

U.S. Pat. No. 5,321,257 to Danisch describes a modified optical fiber that is provided with a light absorbent region on a portion of the outer fiber surface whereby the curvature at such modified region may be remotely detected by the change in the overall light transmission capacity of the fiber. This patent depicts the deployment of clusters of modified fibers capable of detecting a bend in three dimensional shape (FIG. 12).

Patent Co-operation Treaty application PCT/CA94/00314 (published Dec. 22, 1994 as WO 94/29671) discloses the use of looped fiber optic light wave guides to measure curvature. The fiber is looped to provide outgoing and return wave paths that pass through a looped end that effects a 180 degree bend. The surface of the fiber is treated adjacent to and within the curvature of the looped portion to render it absorbent of light. In one configuration it is the side of the fiber surface lying along the top plane of the looped end that is treated. Once the looped end is so treated, it is sensitive to its state of curvature when deflected out of or through the normally flat plane of the loop. Such flexure can be detected remotely by the change of intensity in returning light carried by the fiber. This provides a measure of localized curvature in the region of the loop.

A further paper on this subject by the inventor herein entitled "Laminated Beam Loops" has been published in SPIE Vol. 2839, pp. 311–322, 1996. The contents of this paper, the above referenced U.S. patents and the published PCT application PCT/CA94/00314 are all adopted by reference herein.

Looped optical fiber sensors can measure bend and, in accordance with the invention hereafter described, twist based on the disposition of the loop and the location of the treated, light absorbing region of the fiber surface adjacent to or within the loop. The sensitive region at the looped end of the fiber can be contained within a running length of on the order to three millimeters to a few centimeters depending on desired sensitivity and the diameter of the fibers. This provides a corresponding span for the sampling of the average state of curvature of the sensing looped end of the optic fiber.

Fiber optic technology is convenient for use in sensors because it is robust, benign and inexpensive. A need exists for a fiber-optic based sensor system that can provide remote information on the locations of objects in space, the shape of surfaces and changes in the shape of surfaces. The present invention addresses such a need.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In one broad aspect, the invention is a shape and position measuring tool which comprises:

(1) a flexible substrate having a longitudinal dimension;

(2) spaced flexure sensors, attached to and positioned at known flexure sensor spacing intervals along the length of the substrate to provide signals indicating the local state of flexure present in the substrate at the locations where the flexure sensors are attached to the substrate; and (3) sensor data processing means coupled to the bend flexure sensors for receiving signals therefrom and for presenting data on the geometric configuration of the substrate wherein the sensor data processing means operates by extrapolating the geometric configuration of the substrate from the flexure signals provided by the flexure sensors and the spacing intervals between such sensors.

This invention works by sampling curvature at multiple, spaced intervals along a supporting substrate which is flexible, and preferably substantially continuous, incompressible and inextensible. This substrate acts as a carrier for the sensors. The Invention relies upon inter-referencing the position of flexure sensors located at known intervals along the supporting substrate with the location of adjacent sensors so that the location of all sensors with respect to each other is known.

The flexure conditions being measured may include two degrees of flexural freedom, e.g. measuring both bending and the sate of twist present in the substrate or bending in separate directions.

Flexure may be measured by twist and bend sensors attached to and positioned at known twist and bend sensor spacing intervals along the length of the substrate. These provide signals indicating the local state of twist and bending present in the substrate at the locations where such sensors are attached to the substrate.

Bend can be measured about either one or two axes that are orthogonal to the longitudinal dimension of the substrate, depending on the nature of the substrate. Thus a rope-like substrate would require that bending be sensed about two such axes, either directly or indirectly.

By providing a substrate which is deformable only in restricted degrees of freedom, the number of sensors required can be reduced. As a preferred configuration, bend and twist sensors may be bonded to a substrate which is in the form of a ribbon. In such case bend sensors are only required for measuring flexure of the ribbon in its permitted bending mode. This reduces the number of bend sensors needed per unit of length.

A ribbon is an article which is substantially limited to bending along its length about axes which are transverse to the longitudinal dimension of the ribbon while the ribbon remains free to twist about such longitudinal dimension. Thus a single bend sensor will suffice to measure bend at a location along a ribbon. To complete the definition of the geometric configuration of a ribbon-like substrate, twist as well must be measured by twist sensors located at known intervals along the longitudinal extent of the length of the ribbon. Such bend and twist sensors may be interspersed with each other or co-located along the ribbon.

When the substrate is of a ribbon-like configuration employing both bend and twist sensors freedom of movement and tracking of the geometric configuration of the ribbon in three dimensional space is nevertheless available. This is because the ability of a ribbon to twist allows portions of the ribbon to be re-oriented in any direction in space.

As an alternate configuration, bend and twist sensors may be coupled along a pliable core or substrate that has two degrees of bending freedom, akin to a rope. In such applications, two bend sensors may be provided for each twist sensor to provide balanced sensing of bend and twist.

This configuration for the invention can also be equivalently implemented by applying an instrumented planar tape of the ribbon-type format to the outside, or inside, of a cylindrical flexure such as a hose. When a hose-like carrier is employed, sensor communications may pass through the core.

The invention will perform with greater precision if the flexure sensors are mounted along the neutral axis of a carrier substrate. This can be achieved in the case of a ribbon substrate by assembling two substrate portions as a lamination with the sensors contained between the layers. By using ribbon layers of similar flexibility, the sensors will be positioned essentially along the neutral.

Bend sensors based on optical fiber technology, and particularly looped-end fibers, are suitable for sampling curvatures at multiple locations, the associated fiber ends all being connectable to a multi-fiber light source, light sensing and signal processing unit. The bend and twist sensors may be based on optical fibers that have been rendered sensitive to their state of curvature by having appropriate, local portions or regions of their outer surfaces rendered absorbent to light passing through such fibers.

In the case of a ribbon substrate, the sensors may be based on optical fibers with curvature-sensitized portions that are aligned parallel to the plane of the ribbon at the locations where the treated portions are attached to the substrate.

To measure bend the sensitized portions of a treated fiber optic sensor may be generally aligned to lie across the axis about which bending is to occur, e.g. the axes extending transversely to the length of a ribbon substrate.

When looped-ends are employed, the treated, light-absorbing portions of the surfaces of each of the loops may be located either on one half of the loop only, or, if optionally on both halves of the loop, then on the same face of the loop in order to measure bend. By treating both sides, two treated portions of the fiber will be modulating the light transmitted by the fiber based on the same local condition of curvature that each treated portion is experiencing. This will raise the ratio of the "signal" to the background "carrier" of light within the fiber guide.

To measure twist with a looped sensor whose loop straddles the central longitudinal median line of a ribbon substrate may be conveniently employed: The surface of the optical fiber is treated on half portions, on opposite faces of the loop, the treatment being applied on opposite sides of the median line. The portions of loops so treated and positioned respond inversely to bending, but cumulatively to twisting and therefore measure twist exclusively.

For looped-end sensors it is not essential that the central, most curved, portion of the loop be treated to render it non-transmissive of light. It is sufficient for the treated portion to be proximate to the looped end to benefit from the mode filtering effect of the looped end.

For convenience of signal processing, when a ribbon substrate is employed, both twist and bend at a single location can be measured using two bend sensors which may or may not be looped optical fibers. The directions of the treated portions of the respective sensors of the pair are preferably oriented at substantially the same angle off of the longitudinal median line of the ribbon substrate and preferably at 45 degrees to the longitudinal dimension of the substrate. This permits two fibers to be used to measure both bend and twist at a single location by processing their outputs to extract their sum and difference signals as a measure of twist or bend. The referenced angular orientations simplify signal processing. With computational adjustments other angles would still be able to provide both twist and bend values from a splayed pair of sensors. Since the sensors will normally be operated in their linear ranges, the computations normally involve sums and differences of linear equations very amenable to high speed automatic computation.

Although this description concentrates on inextensible ribbon-like flexures with longitudinally distributed sensors, the invention includes structures based on flexures that are not inextensible, not narrow and not planar.

By assembling distributed sets of sensors, flexure sensing regions may be formed not only linearly, as along a supporting rope or ribbon-like substrate, but also over an area using a flexible carrier sheet as the substrate. For instance, a wide planar form can be a lamination in the form of a flexible, planar carrier, such as a rubber and fiber sheet, with sensor groups distributed across its area. The groups can consist of bend and twist sensors, or dual-direction bend sensors, which are able to completely describe the shape of the sheet. Using data on the state of curvature at each sensing region, and knowing the separation between sensors, the signal detection system can construct a depiction of the shape of the carrier. With the carrier sheet placed in contact with a geometric surface of unknown form, the shape of such surface can be measured, at least where the sheet and surface are in contact.

As another instance of non-planar forms, conventional measuring tapes (e.g. for measuring linear distances in carpentry) are of quasiplanar shape, having a continuous transverse bend when axially flat. This gives them greater stiffness, and concentrates axial bends at discrete axial locations unless the tape is constrained on a spool (as when the tape is rewound into its holder). In this latter case transverse bends are eliminated, being transformed into bends along the central axis of the tape. The transversely bent conventional form would be a possible form for the invention as well.

As another instance of non-planar forms, a cylindrical form of substrate or carrier that resists torsion because of embedded wires or helical ribs may be employed. Such a substrate will bend in 2 DOF, without permitting twist. This form could only be used to determine constrained three dimensional locations and 2 DOF orientation information.

In all forms, the sensors for bend need not be co-located with the sensors for twist, and bend sensors need not be co-located with their differently oriented bend sensing mates (unless both bend and twist are being measured, as described above). It is sufficient for them to be distributed along the substrate at known intervals that allow the configuration of the substrate to be determined.

Although most references herein have been made to inextensible flexures, extensibility can be allowed to exist in the substrate. Thus, a possible form of the invention could be a stretchable flexure wherein not only bend and possibly torsion are measured but also extension. The degree of extension must be detected to ensure that the spacings between the flexure sensors will be known. Extension sensors could include conductive elastomers sensitive to extension. For convenience and to improve compliance, extension could be limited to a small increase in length beyond which the flexure becomes functionally inextensible.

While reference is made herein to a "substrate" as a carrier for the flexure sensors, the word "substrate" is not restricted in its meaning to a strict positional relationship with the sensors. While the sensors may be located on an outer surface of the substrate, they may also be embedded or contained within the body of the substrate. It is sufficient for the substrate to serve as a carrier for the sensors, preserving their inter-sensor spacings and their orientations with respect of the body of the substrate.

This shape or profile measuring tool may be coupled over all or part of its extent by constraining means to a portion of a body or object the location, shape or orientation in space of which is to be measured. It is thereby able to provide information indicating the position, shape, orientation and motion of the coupled portion. Such information is obtained from all parts of the sensor including uncoupled portions.

Because the invention provides locational information along and for its entire length, it is permissible for a portion of the substrate to be uncoupled from the body being measured over parts of its extent. It is sufficient for at least one portion of the sensor to be attached to a body for the location and orientation of that portion of the body to be determined with respect to a reference point elsewhere on the sensor. "Signature" characteristics of the coupled portions, such as invariant proportional signals between specific sensors, can be used to identify and track the coupled portions.

The invention performs in the same sense that a snake is able to be aware kinaesthetically of the location of its head, and its entire body, with respect to the position of its tail. Every sensor's location, and orientation, can be determined with respect to other sensors by inter-referencing the positions of the intervening sensors.

This capacity to permit portions of this position, orientation and shape measuring tool to be uncoupled along portions of its length from the body or object being measured is especially advantageous when this invention is used to effect motion capture of the human form.

Because of the capacity of the shape measuring tool of the invention to equally track surface segments anywhere along its length, the invention does not require precision location of the instrumented tool with respect to the joints whose angular positions are to be measured. Thus, for example, a loose-fitting, shape measurement glove whose position shifts over a human hand during movement is, if implemented in accordance with the invention, nevertheless able to provide accurate output signals as to the location and orientations of the various joints of the wearer's hand.

Another potential application of the invention is as a "key board" or device for inputting signals based upon contact and applied pressure. Mounted on a compressible under-support, a ribbon sensor can provide outputs that are indicative to the location of contact, the degree of applied pressure, and provide a third signal according to the amount of twist created. An instrumented planar array positioned over a compressible under-support can provide positional information as to a point of contact in two dimensions. The degree of pressure being applied at a point can provide a further dimension for expression by a user of such "key board".

The foregoing summarizes the principal feature of the invention and some of its optional aspects. The invention may be further understood by the description of the preferred embodiments, in conjunction with the drawings, which now follow.

DESCRIPTION OF THE PREFERRED EMBODIMENT

Figure 1:
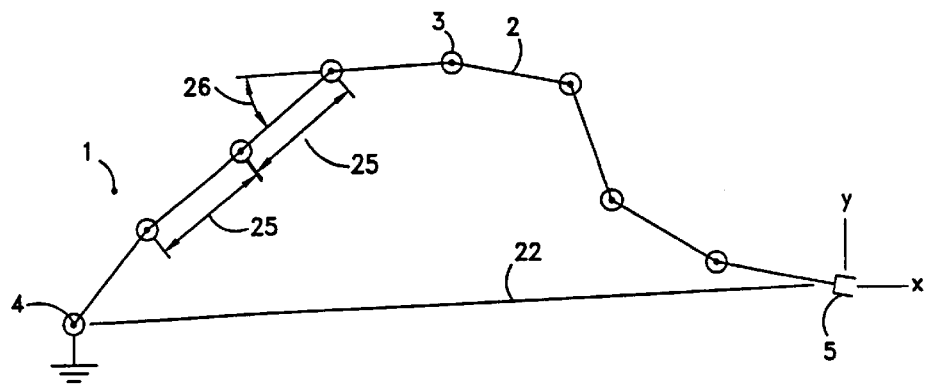
FIG. 1 is a schematic of a planar mechanism composed of rotary bending joints and links provided with joint sensors whereby the location in space of the distal end with respect to the base end can be determined.

FIG. 1 represents a mechanism 1 in the form of rigid links 2 that are coupled at joints 3 that have parallel axes. This mechanism 1 is therefore free to move or bend in a single plane. It is anchored to a reference point 4 at one end and may have an end effector 5 at its other end. All of the joints 3 are instrumented to have sensors (not shown) which provide information as to the angular orientation of the joints 3.

It is possible by processing the signals from the sensors and knowing the lengths of each of the links 2 to determine by calculation the distance to and position of the end effector 5 in space with respect to the reference point 4.

In fact, the positions of all joins 3, and locations therebetween on specific links 2, can be calculated by interpolation.

With rigid links and mechanical joints it has not been possible in the past to multiply such elements to a number which is large enough to provide a shape or position measuring tool which has a high capacity for compliance with an irregularly curved surface. Further, the mechanism of FIG. 1 is limited to motion in a single plane.

Figure 2:
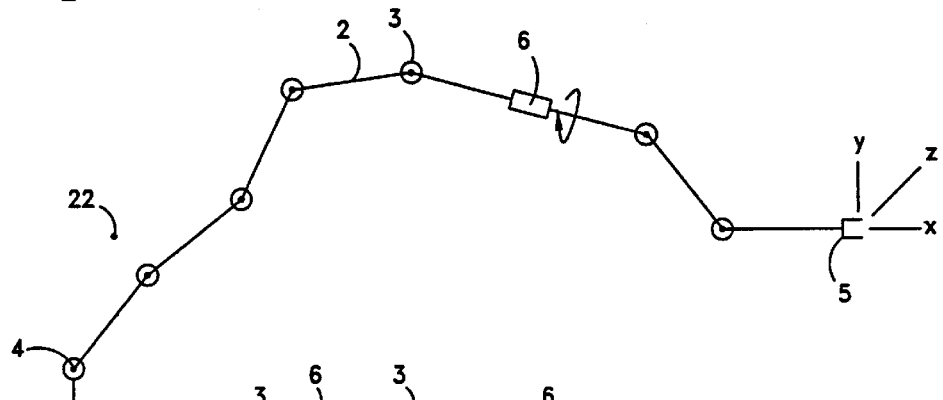
FIG. 2 is the mechanism of FIG. 1 with an additional rotary-twisting joint present.

FIG. 2 depicts a modified mechanism 22 to that of FIG. 1 that contains an additional "twist" joint 6 that also carries a sensor to indicate its rotational position. This twist joint 6 enables the end effector 5 to rotate out of the plane to which the mechanism 1 of FIG. 1 is confined, giving it access to a volume of three dimensional space.

Figure 3:
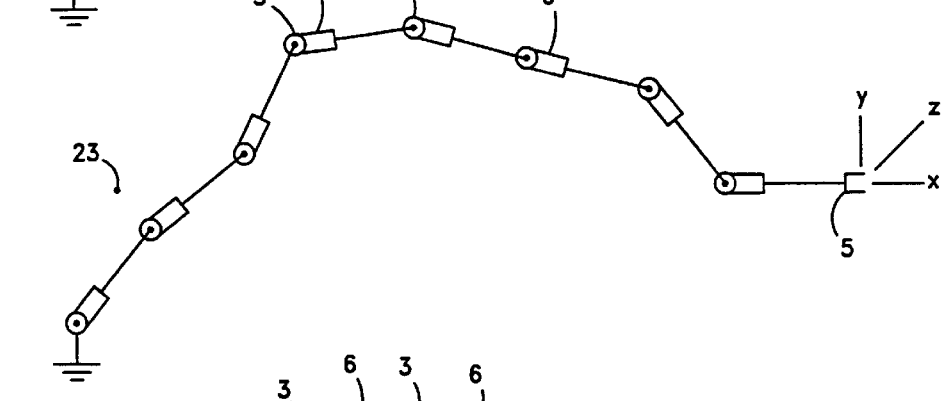
FIG. 3 is the mechanism of FIG. 1 with rotary twisting joints associated with each rotary-bending joint.
Figure 4:
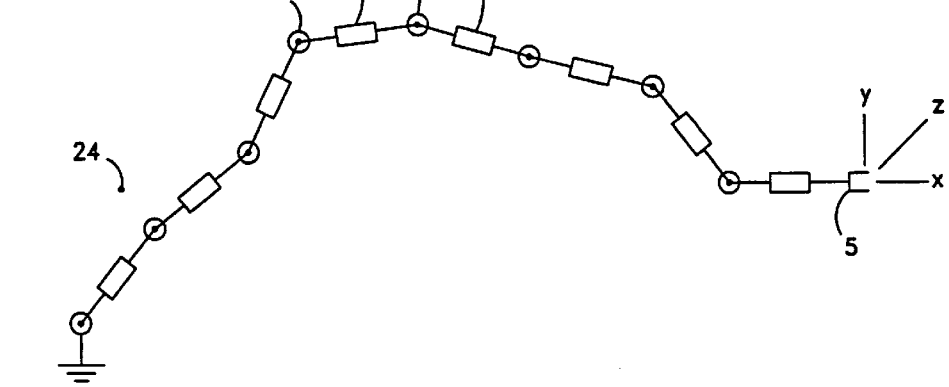
FIG. 4 is the mechanism of FIG. 3 with the twisting and bending joints separately disposed within the mechanism.

FIG. 3 shows a generalized expansion of the mechanism 22 of FIG. 2 wherein multiple twist joints 6 are provided, shown co-located with bending joints 3, along the length of the modified mechanism 23. FIG. 4 shows a similar generalized expansion to provide a mechanism 24 wherein the bend 3 and twist 6 joints are distributed along the length of the mechanism 24 without necessarily being co-located.

The mechanisms of FIGS. 3 and 4 have the mechanical capability of conforming to some degree to a surface that is curved in three dimensions. However, with the use of rigid links and mechanical joints, such elements could not in the past be multiplied to provide a measuring tool with a high capacity for compliance with a curved surface.

Referring again to FIG. 1, it is possible to calculate the location in two dimensions of the end effector 5 and each joint 3 with respect to the reference point 4 using simple geometry based upon the length of each link 2 and the angular setting 26 of each joint 3. Similarly, such parameters can be calculated in three dimensional space for the mechanisms 22, 23, 24 of FIGS. 2, 3 and 4. To indicate this the symbols for x, y and z coordinates are provided opposite the end effector 5 in each of these Figures.

The invention carries this methodology into effect by providing a flexible substrate 8, 21 to serve as a carrier for a series of flexure-detecting sensors 10, 11 distributed along its length. This substrate, as shown in FIGS. 5, 6 may have a reference surface 28 which may be applied against the outer surface of an object to extract a profile therefrom based on signals received from the sensors indicating their angular orientations.

This technique of measuring shape by sampling curvature and twist using a flexible substrate 8 with a reference surface 28 can be applied if the curvatures and twists being measured are not permitted to take on sharp gradients, or if the sensor spacing is sufficiently small to adequately sample the gradients. The spacing and individual range of sensors determines the permissible range of operation for the sensor array.

Figure 5:
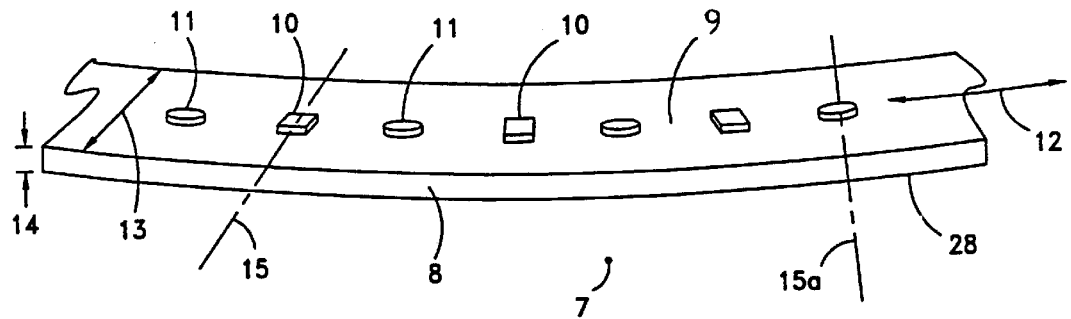
FIG. 5 is a pictorial depiction of a ribbon carrying bend and twist sensor.
Figure 6:
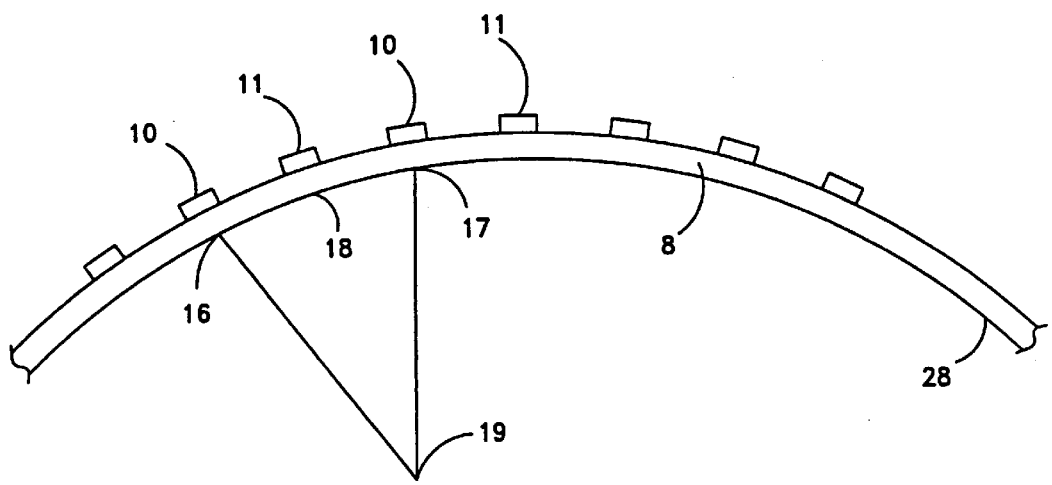
FIG. 6 is a side view of the ribbon of FIG. 5 bent into a curve.

In FIG. 5, a shape and position measuring tool 7 is shown that relies upon a flexible substrate 8 shaped in the form of a ribbon 8. A "ribbon" describes herein a body of flexible material that is essentially inextensible, has a longitudinal dimension 12 of considerable length compared to its width 13 and depth 14 and whose width 13 is so much greater than its depth that bending of the body is limited substantially to bending about axes 15, 15a which are transverse to the longitudinal dimension 12 of the ribbon. A ribbon is, however, free to twist. For this reason the transverse bending axes 15, 15a are not necessarily parallel.

Figure 8:
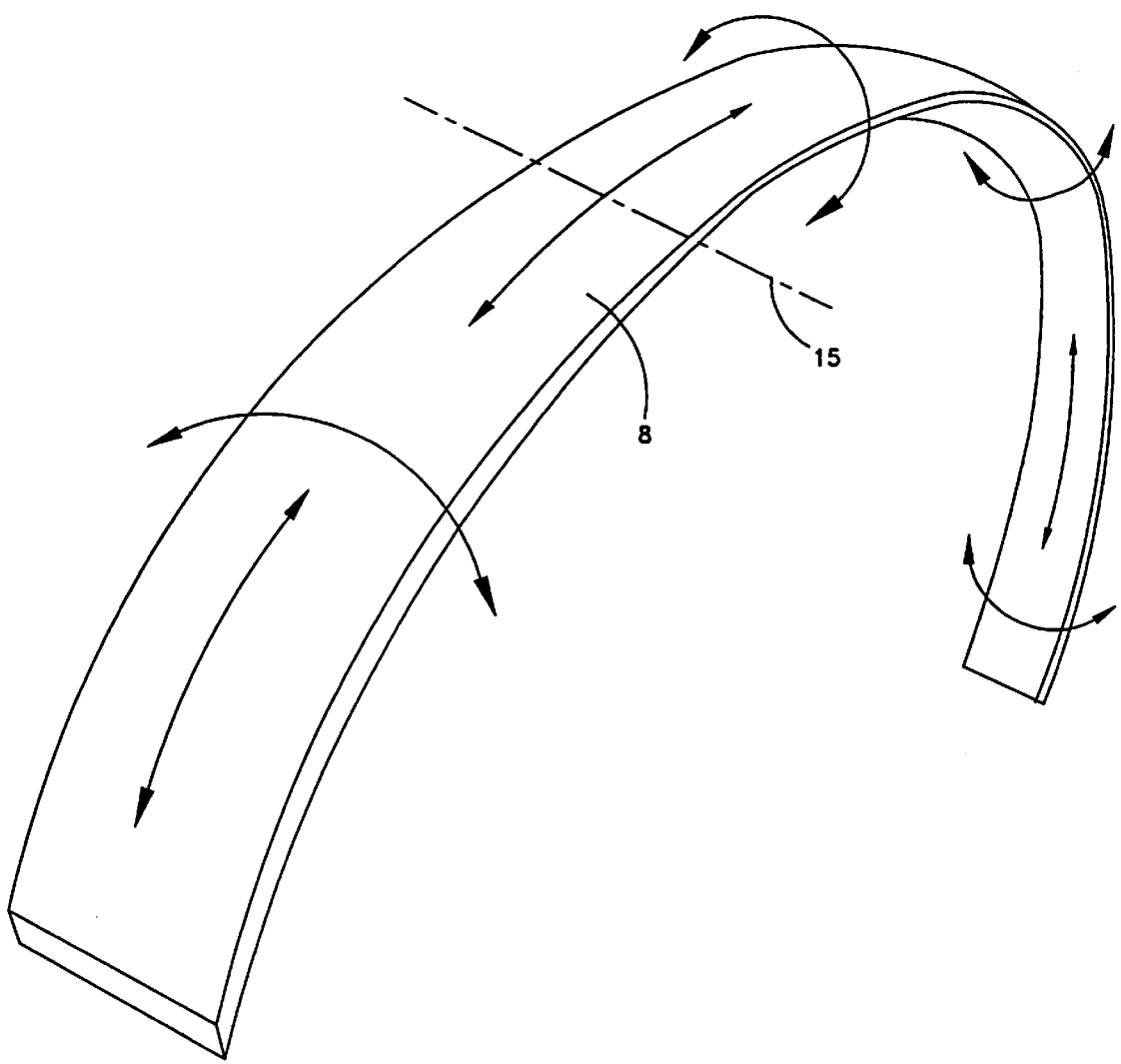
FIG. 8 is a pictorial depiction of a ribbon in space depicting bend and twist.

FIG. 8 depicts a ribbon 8 with arrows indicating both bending and twisting.

In FIG. 5 a ribbon substrate 8 has distributed along and attached to its exposed surface 9 a series of bend 10 and twist 11 sensors. These are schematically depicted as essentially point objects. In fact, all such sensors 10, 11 are coupled to a signal processing unit (not shown in FIG. 5) that receives signals from such sensors 10, 11.

In FIG. 6, the ribbon 8 of FIG. 5 is shown in a side view when bent within a single plane, without twist being present. The curvature between two points 16, 17 proximate to bend sensors 10 may be approximated as a circular arc 18 about a center 19. This approximation will be sufficient to provide reasonable accuracy if the ribbon 8 bends in a well-behaved manner e.g. if the ribbon 8 has relatively constant thickness 14 and flexing characteristic, and if the sensors 10 are sufficiently dense in their distribution along the substrate 8.

The curvature between points 16 and 17 can be estimated by the state of measured curvature at points 16,17 as measured by the bend sensors 10,10 located at those positions. If these curvatures differ, an average curvature, or a curvature value based upon further adjacent curvature measurements, may be taken as the approximated curvature for the arc 18.

Knowing the value of the curvature of the arc 18 and the arc length, being essentially the separation of the sensors 10 distributed along the ribbon 8, the position of a consecutive point 17 can be calculated with reference to an adjacent point 16. This type of inter-referencing calculation can proceed from a base end of a ribbon 8 to a terminal end. Such a calculation will provide geometric values for the positions of all of the sensors 10, 11 in space, plus by extrapolation for any intermediate locations on the ribbon 8.

The above explanation has been made for simplicity by reference to the bend sensors 10 only. Similar calculations can incorporate data received from the twist sensors 11 to provide geometric data in three dimensional space.

If a flat untwisted section of substrate 8 has two parallel ends, then twist is defined as the angular difference between the ends when a twist is applied. When the substrate 8 is also bent, the twist is interpreted to be the same as that present in, say, a thin cylindrical driveshaft along its long axis, i.e. the twist remains invariant as the shaft is bent. When this happens, the end lines are no longer in parallel planes.

If twist alone is applied to a straight section of the substrate 8, then the twist will not affect the position of the longitudinal axis line 12 until a section is reached which has a bend.

A model of the substrate's shape may be constructed in a computer, based on the above calculus. A convenient means of presenting the model visually is to draw the arcs in sequence, using small flat sub-arc segments. Refinements may be added by use of interpolation, averaging, and other conventional curve fitting techniques.

Figure 7:
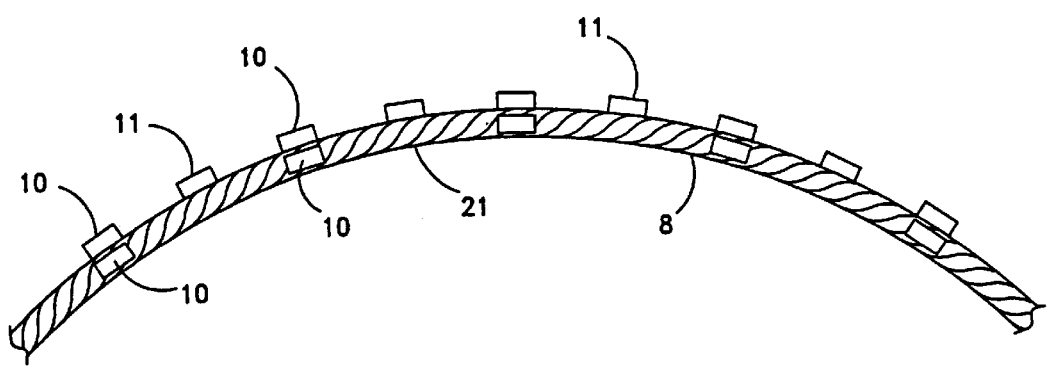
FIG. 7 is a depiction of a "rope" substrate carrying bend and twist sensors.

FIG. 6 has demonstrated the invention for simplicity by reference to a ribbon substrate 8, as defined above. FIG. 7 depicts, for visual impact, a "rope" 20 provided with bend and twist sensors 10, 11 along its entire length. Again, similar calculations based on the signals received from such sensors can calculate the geometric orientation of such a fully flexible substrate in space. While a "rope" 20 is pictorially depicted, in practice the fully flexible substrate 21 could be a length of extruded rubber or flexible polymeric material within which the sensors may be embedded. If this flexure has a hollow core, such core may be used to route the optical fibers.

In FIG. 6, two bend sensors 10 for every single twist sensor 11 are depicted. This is to ensure that bend in two directions rather than only in a single plane can be detected. While the bend sensors 10 are depicted as being co-located, this is not a necessary requirement. It is sufficient for all sensors 10, 11 to be distributed along the substrate 21 so that their signal values can be combined with the signal values of other sensors to permit calculation of the geometric disposition of the substrate 21.

Sensors suitable for bend and twist measurements include fiber optic bend and strain sensors; conductive elastomer sensors of bend and extension generally referred to as force sensitive resistors (FSRs), bend sensitive resistors (BSRs) and piezoresistive sensors; electrical strain gauges including bonded wire and semiconductor forms; and any other sensors capable of measuring bending, extension, and torsion, including capacitive, magnetic, and piezoelectric methods.

Fiber optic sensors such as those described in U.S. Pat. No. 5,321,257 and PCT publication WO 94/29671 (application PCT/94CA/00314) are well suited for this application because these sensors are immune to electromagnetic interference and will function in the neutral axis of a flexure, where there is no strain. The type of fiber optic sensors referred to in these publications can be classified as "Bend Enhanced Fibers".

Bend Enhanced Fiber sensors (BEF) are based on the loss of light from a light guide in a zone where the core/cladding interface has been treated and modified such that light striking the modified zone is lost from the core and does not return. In BEF sensors, a nominally straight fiber is treated on one side so that light loss increases as the light guide bends to make the straight treated zone more convex and decreases as the guide bends the other way.

Figure 9:
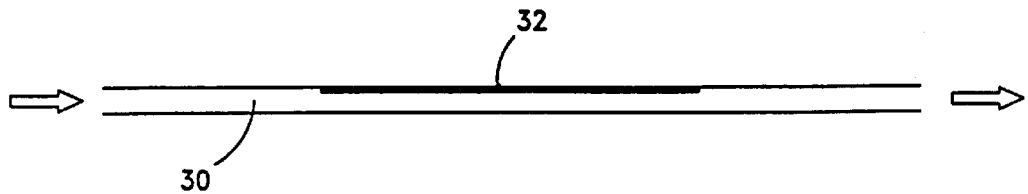
FIG. 9 is a side view straight optical fiber with an upper surface treated to absorb light.
Figure 10:
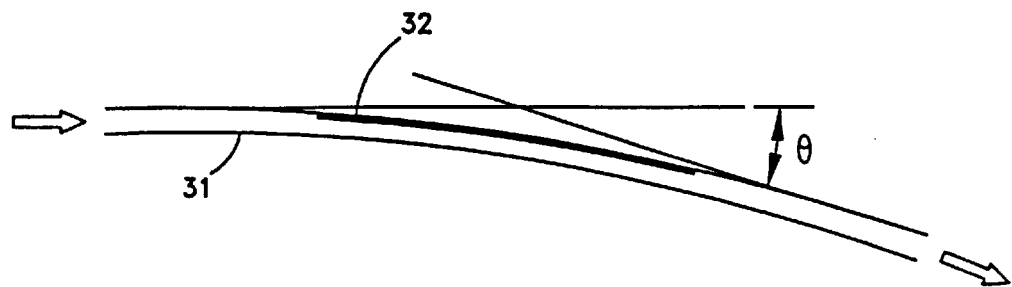
FIG. 10 is the fiber of FIG. 9 in a bent condition.

Straight 30 and bent 31 BEF sensors are respectively shown in FIGS. 9 and 10. The treated portions 32 on the top surface are shown in black. The geometry is such that the modulation of the intensity of light travelling through the fiber 30, 31 is linear with curvature of the fiber. Output is bipolar about the straight shape. Modulation by curvature in the treated zone has been measured to be 3000 times that produced by curvature of untreated light guides.

Figure 11:
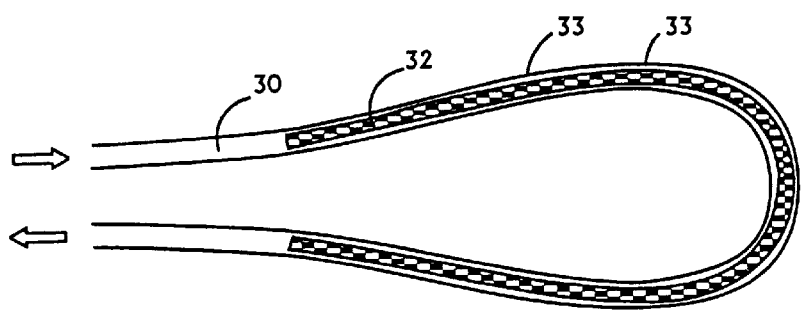
FIG. 11 is a plan view of a looped optical fiber with an upper surface treated to absorb light and in planar configuration.
Figure 12:
FIG. 12 is a side view of FIG. 11.
Figure 13:
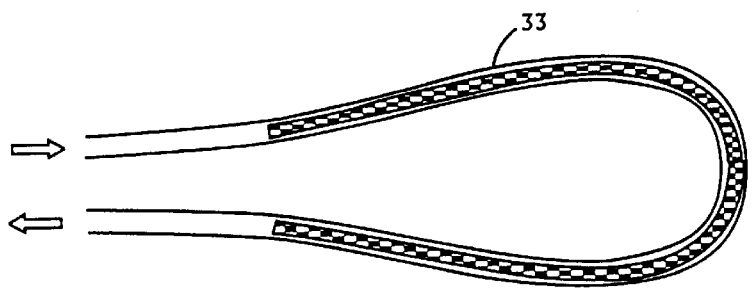
FIGS. 13 and 14 correspond to FIGS. 11 and 12 with the looped end in a curved configuration.
Figure 14:
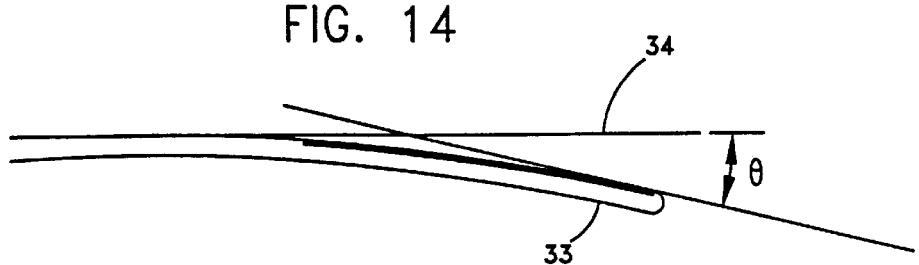

In loop sensors, the treatment is on one face of the light guide loop 33 (see FIGS. 11 and 12), and modulation occurs when the loop 33 is bent out of its plane 34 (see FIGS. 13 and 14). The treated surface 32 in FIGS. 11 and 13 is shown as shaded. In FIGS. 12 and 14 it is shown as a darkened line.

Figure 15:
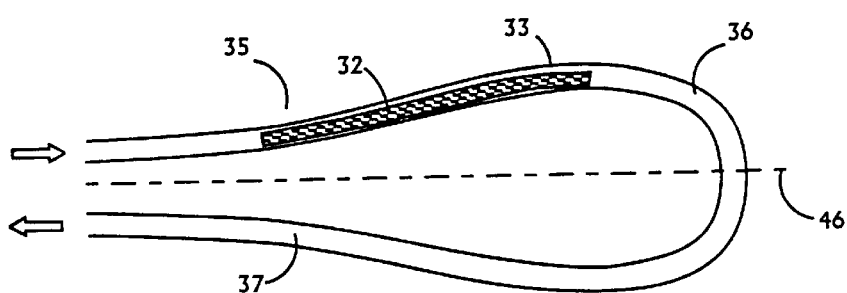
FIGS. 15 and 16 are similar to FIGS. 11 and 12 but with the treated surface present only on half of the loop.
Figure 16:
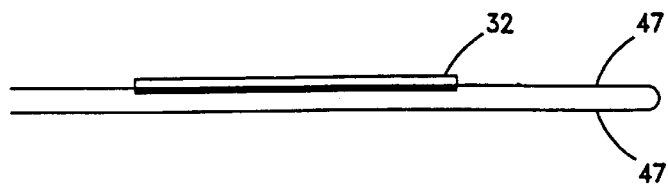
Figure 17:
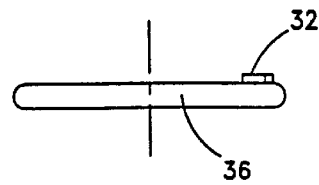
FIG. 17 is a right end view of the looped fiber of FIGS. 15 and 16.
Figure 18:
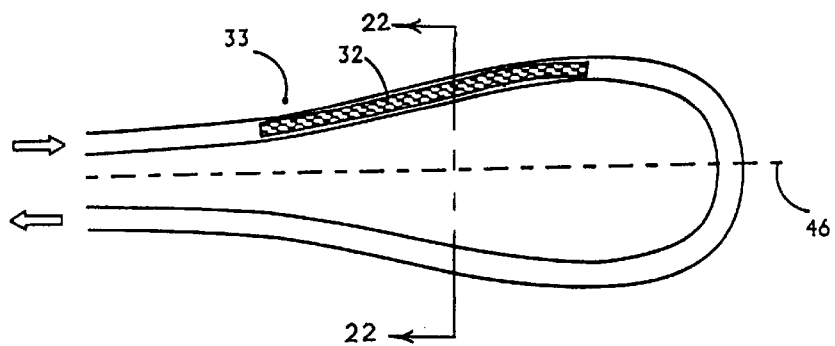
FIGS. 18, 19 and 21 depict the looped fiber of FIGS. 15, 16 and 17 with treatment of the loops on opposite, opposed sides.

FIGS. 15, 16 and 17 show a looped sensor 35 wherein the treated zone 32 occurs on the portion of the loop 33 leading up to the region of reversing curvature 36. It is not necessary for this reversing region 36 to be treated, although this is optional. As well, the opposite half of the loop 33 may remain untreated.

Throughput and modulation efficiencies are particularly high for loop sensors. The combination of treated zones 32 on the light guide surface and the tight loops is synergistic. A treated zone 32 on top of the light guide emphasizes loss of light in modes that would not pass freely by the nearby tight loop when the loop is straight, so there is little penalty for introducing a tightly curved (and therefore lossy) loop 33 in the light guide. However, when the loop 33 is bent out of its plane, the loss zones interact strongly with modes that would otherwise travel freely around the loop 33, resulting in efficient modulation.

Intensity based sensors are attractive for low cost applications because signal processing can be very simple. However, intensity in a light guide can be a function of many things other than the measurand (curvature). Unwanted intensity modulators include:

Variations in optical connections
Bending of leads
Aging of light source
Aging of light guides
Effect of temperature on light sources and detectors.

Figure 23:
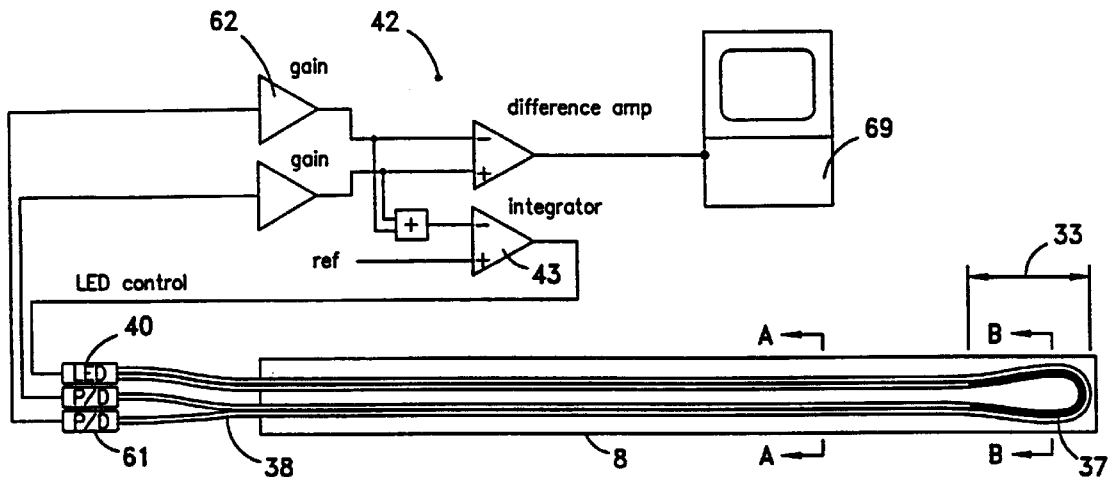
FIG. 23 depicts a single, nested looped sensor on a tape connected to signal processing operational amplifiers to feed a data processing computer and video display.
Figure 24:
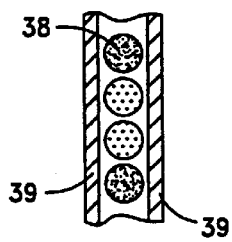
FIG. 24 is a cross-sectional end view through the tape of FIG. 23 in the untreated carrier length.

Looped fiber optic technology overcomes these obstacles by using an optical and electronic bridging technique involving two opposed laminated loops. A standard balanced loop sensor configuration is shown in FIG. 23, wherein two "nested" loops 37 are employed.

The four leads 38 are kept parallel and contiguous, arranged in a plane inside sealed laminations. This reduces the predominant degrees of freedom for lead bending from two to one. One LED light source 40 is used to illuminate both loops, and is controlled through an integrator 43 to keep the sum of the loop throughputs constant. The controlled throughputs include optical and electronic signals (i.e. LED, light guides, photodiodes, and amplifiers). The constant sum technique for controlling the LED 40 simultaneously overcomes common mode modulations due to aging or temperature effects on optoelectronic devices and light guides, and bending of the leads.

Figure 25:
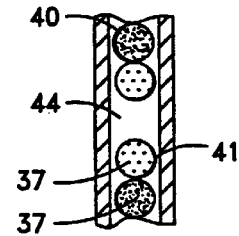
FIG. 25 is a cross-sectional end view through the tape of FIG. 23 at the looped sensor end.
Figure 26:
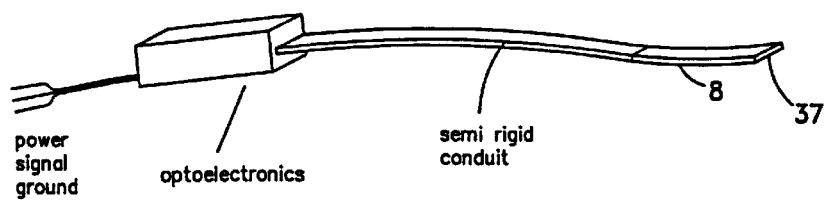
FIG. 26 is a pictorial depiction of the sensor of FIG. 23 supported by a semi rigid conduit.

However, the measurand (curvature) is not in common mode because the two loops 37 are treated on opposite, outwardly directed, FIG. 25, faces 40, 41 so that a given bend causes throughput to increase in one and decrease in the other. The signals are linear so they may be subtracted in an operational amplifier circuit 42 to yield an output signal linear with curvature and unaffected by common mode errors. Because of the substraction, the resulting signal is also twice as large as that from a single loop 33.

The resulting complete sensing system amounts to an optoelectronic balanced bridge which produces a high level electrical output using one quad operational amplifier circuit 42. The circuit functions to produce a high level output signal that rejects common mode errors.

A practical low cost sensor may be manufactured by forming nested loops 37 around pins on 1 cm centers, in situ treatment to create loss zones, and in situ application of laminations 39 which hold the loops 37 and leads 38 in plane. Present lead length capacity has been demonstrated at 5.5 meters, but can be expanded. Standard laminations with outer layers of latex rubber, and two part polyurethane core filler 44 between, are 1.2 mm thick×7 mm wide, and contain 0.5 mm diameter fibers 38 with a polymethylmethacrylate core. Smaller laminations are possible using 0.25 mm diameter fiber 38. The standard, treated, sensitive zone 33 is 12 mm long for 0.5 mm fibers and 6 mm long for 0.25 mm fibers.

Figure 19:
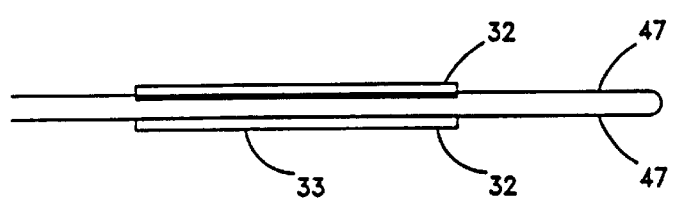
Figure 21:
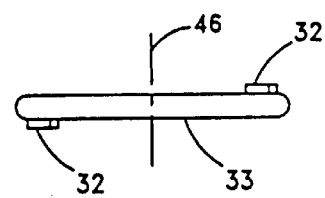
Figure 20:
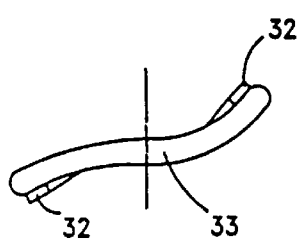
FIG. 20 is the looped fiber of FIGS. 18, 19 and 21 in right end view, in a twisted configuration.
Figure 22:
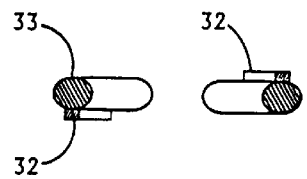
FIG. 22 is a cross-sectional end view of FIG. 18 corresponding to FIG. 21.

As a further variant on looped sensors, a twist sensor as shown in FIGS. 18–21 may be formed in a loop 33 having a bisecting, median line 46 by treating loop 33 on only half of each outwardly facing surface portion and doing so on opposite faces 47, on opposite halves of the loop 33. A loop 33 so treated is shown in FIGS. 19 to 21 with the treated portion 32 shown as being raised for clarity. For FIG. 21 the loop 33 is flat. If bent upwardly or downwardly transversely to the median line 46, the treated surfaces 32 will have opposite effects that cancel. Accordingly, bending is not sensed. However, as shown in FIG. 20 the loop 33 is twisted about its median line 46, the modulating effects of the treated surface portions 32 are additive, providing an enhanced measurement of twist.

Twist and bend sensors of the looped type may be nested so that they are intimately co-located along the substrate.

While looped sensors have been described in detail, certain advantageous deployment of sensors along a substrate will be depicted in FIGS. 27–30 using simplified symbols. These "hockey stick" images 50 may be taken as Treated Bend Enhanced Fiber Sensors 51 with reflective ends 52 that act in reflexive mode in the known manner. The "blade" portion 53, 53a is treated and positioned to be sensitive to bending about axes 15 that are at an angle to the blade's length.

Figure 27:
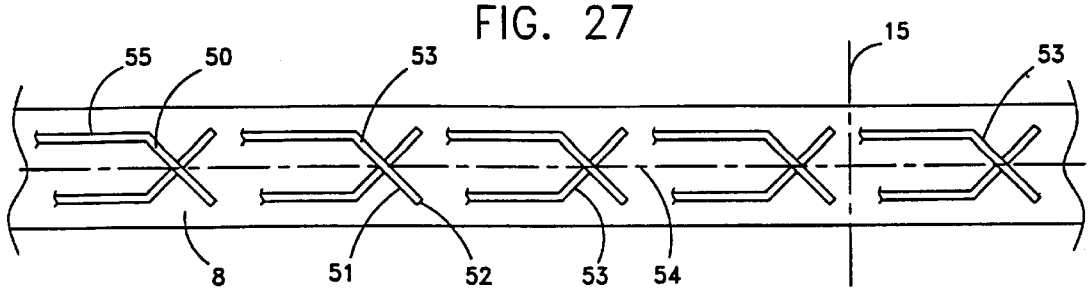
FIG. 27 is a plan view of a ribbon format sensor with crossed, reflexively operating bend sensors.

In FIG. 27 the sensors are laid-out in crossed formats with the sensing portions 53 overlying the median line 54 of the substrate. For clarity the depiction of the leads 55 is broken with the intervening carrier portions omitted. The signals from each pair of sensors, however, may be fed to operational amplifiers as described above to extract their sums and differences. If the sensing portions are located on the same faces (outwardly or inwardly directed) then the sums of the signals will measure bending and the differences will measure twist.

Figure 28:
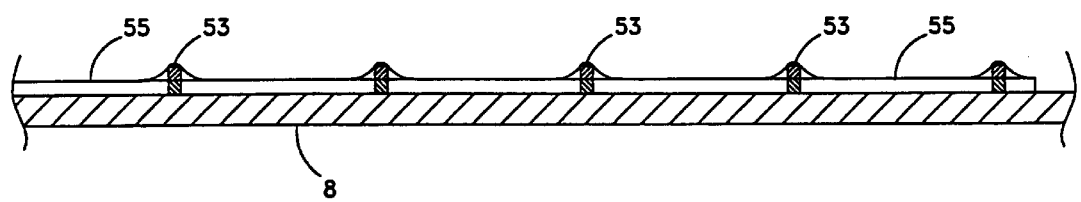
FIG. 28 is a cross-sectional side view of FIG. 27.
Figure 29:
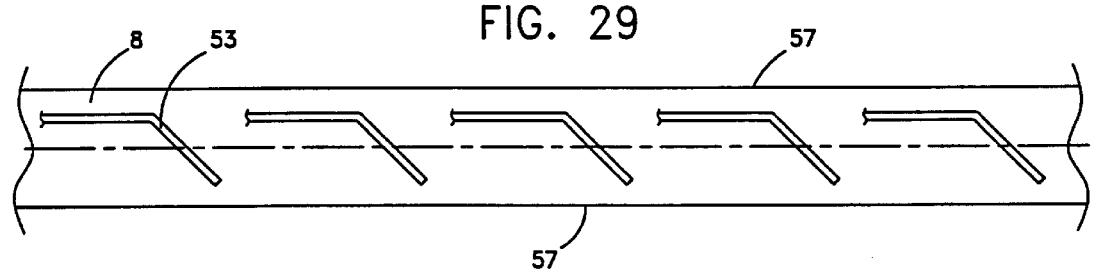
FIGS. 29 and 29a are plan views of half arrays of distributed sensors on ribbon substrates to be placed one over the other to form a laminated sensor.
Figure 30:
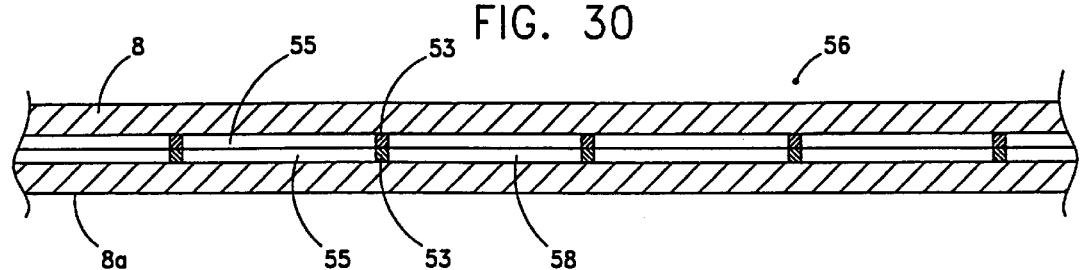
FIG. 30 is a cross-sectional side view of the arrays of FIGS. 29 and 29a assembled as a laminated sensor.

While FIGS. 27 and 28 depict crossed sensor pairs on a single substrate 8, FIGS. 29 to 30 show two partially instrumented substrates 8, 8a which, when assembled as a lamination 56 with the sensors in the center, form a sensor assembly 56 with the sensors effectively embedded within a collective "substrate", positioned conveniently along the neutral axes of the assembly 56.

Figure 29A:
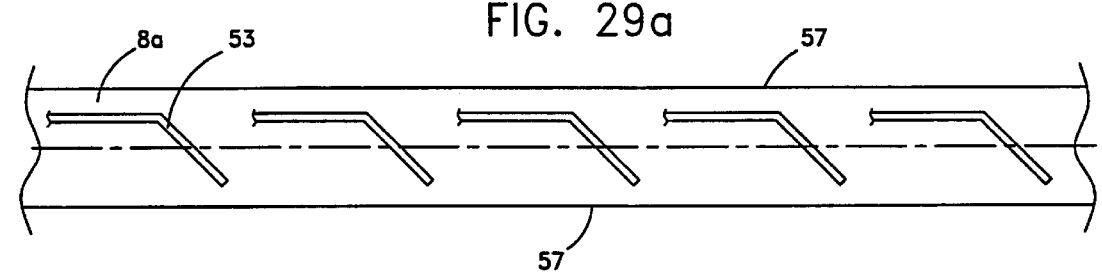

Instead of mounting the sensor blades 53 together in pairs on the substrate 8, half of each pair may be laid-down initially as shown in FIG. 29 and a second nearly identical substrate with loops as in FIG. 29a may be laid over the first. The treated surfaces 53 of FIGS. 29, 29a must be on opposite faces to achieve the same configuration as FIG. 27. If treated on the same faces in FIGS. 29, 29a the outputs from the operational amplifier 42 will be reversed in measuring bend and twist to add stiffness and prevent one sensor of a pair from bending the other, a ribbon of rubber, plastic or metal may be placed between the two substrates.

Once the two substrates are assembled, the two may be laminated together to provide dual sets of sensors with all leads exiting at the same end. A side view of the resulting lamination 56 is shown in FIG. 30.

If identical half-substrates are built, when assembled the treated surface portions face in opposite, outward directions. Nevertheless, by taking sums and differences of the outputs of respective members of each pair of sensors, twist and bend values are still provided.

By bonding the two outer substrates 8 along their edges 57 only, an interior space 58 is formed wherein the leads 55 for each sensor 51 may be routed in a loose form. This provides a tool which is flexible and avoids placing unnecessary stresses on the leads 55 of the sensors.

Figure 31:
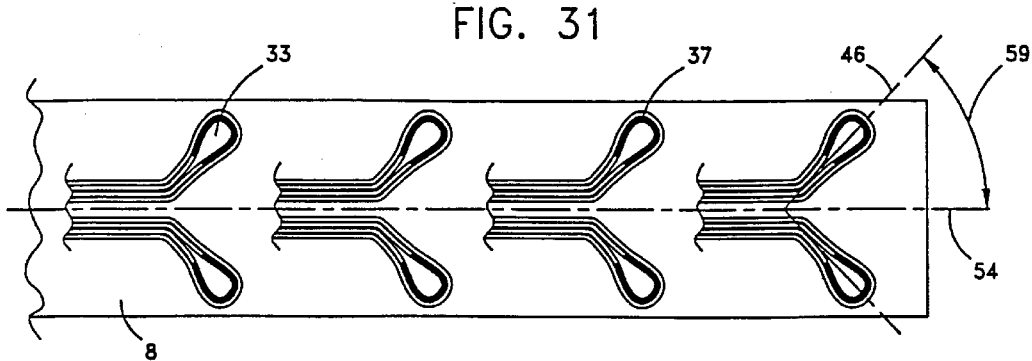
FIG. 31 is a plan view of a ribbon-format sensor with pairs of twin, nested looped sensors deployed in a "Y" configuration.
Figure 32:
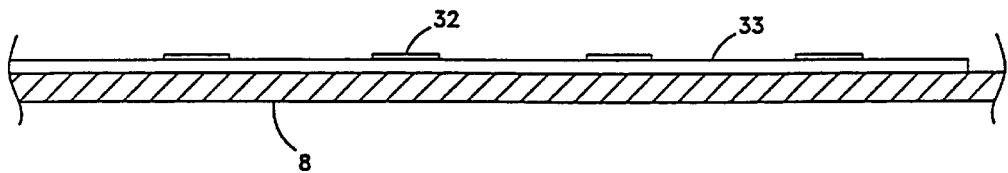
FIG. 32 is a cross-sectional side view of FIG. 31.
Figure 33:
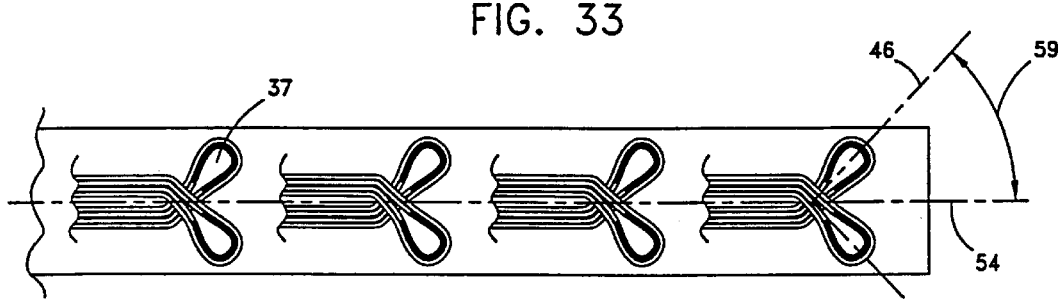
FIG. 33 is a plan view of a ribbon format sensor with pairs of twin, nested looped sensors deployed in an "X" configuration.

In the same manner as depicted for the reflexive fiber sensor 51, looped sensors 33 may be distributed along a substrate 8. FIGS. 31 and 33 show two modes for co-locating nested twin looped sensors in pairs that measure bend and twist simultaneously. FIG. 32 is a cross-sectional view through FIG. 31 showing raised surfaces 32 where the loops 33 carry treated surface portions 32.

In FIG. 31 the loops 33 are separated in a "Y" configuration; in FIG. 33 they overlap in an "X" configuration. In both FIGS. 31 and 33 the median lines 46 of the loops 33 are angled outwardly from the median line 54 of the substrate 8. This angle 59 is preferably equal for sensors 33 on both sides of the substrate 8. This allows both bend and twist values to be obtained by summing and adding outputs. If the angle 59 is 45 degrees, maximum, direct signal strengths corresponding to bend and twist are obtained.

Figure 34:
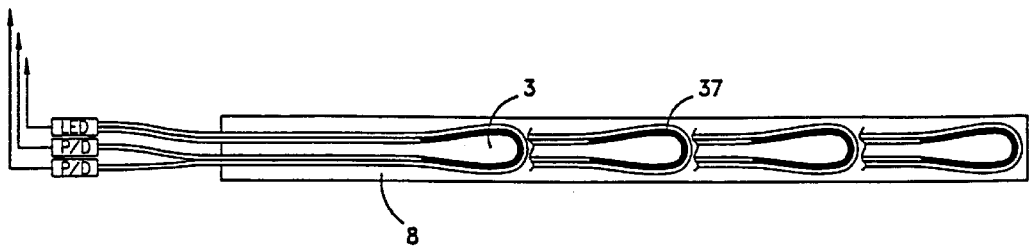
FIG. 34 is a plan view of a ribbon format sensor with a linear array of twin nested loop sensors.

In FIG. 34 a string of nested looped sensors 37 are shown linearly deployed on a ribbon substrate 8. Either the nested loops may alternate as bend and twist sensors, or within each nested pair, one sensor may measure bending and the other twist.

Figure 35:
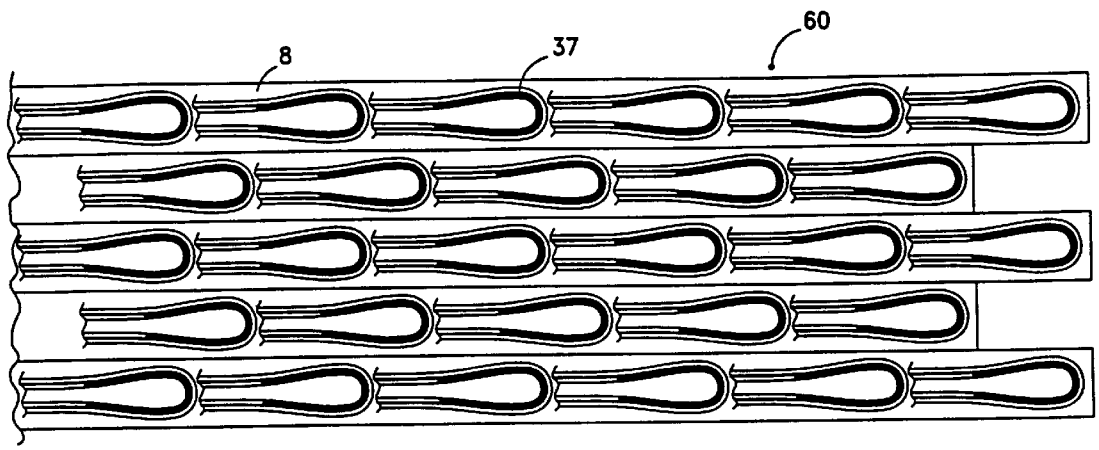
FIG. 35 is a plan view of an assembly of the sensor of FIG. 34 to form a planar array.
Figure 36:
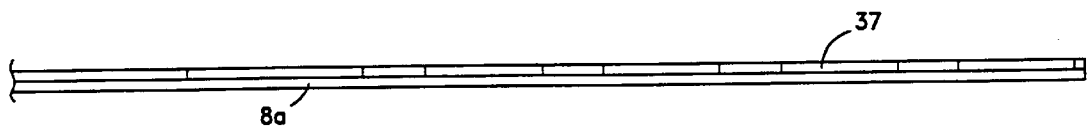
FIG. 36 is a side view of FIG. 35.
Figure 37:
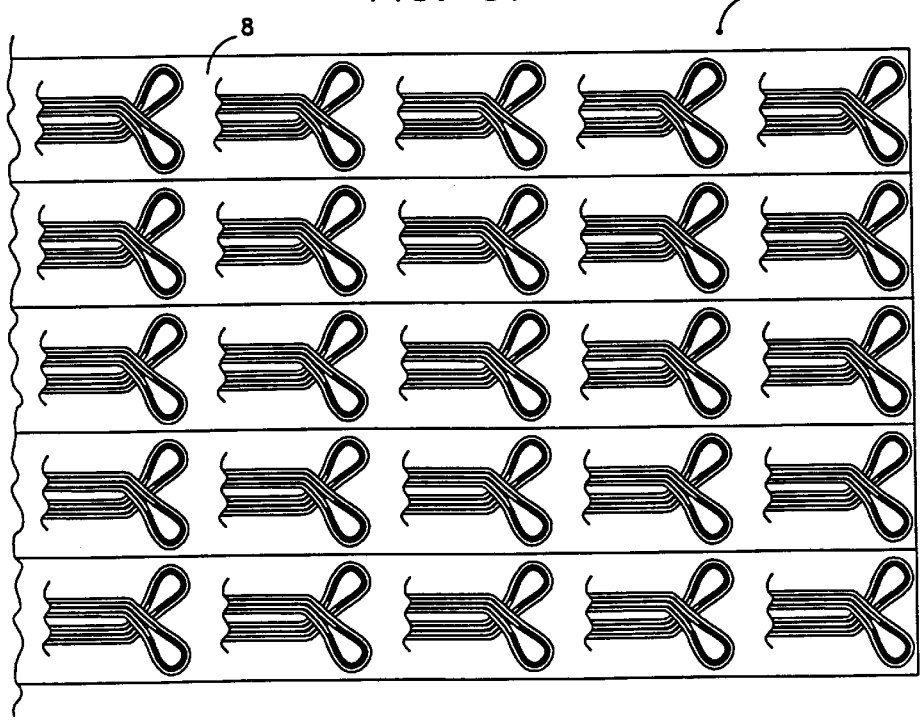
FIG. 37 is a plan view of an assembly of the sensor of FIG. 33 to form a planar array.

Planar arrays 60 of sensors may be assembled by bonding the edges of ribbon substrates 8 together to form a carrier sheet 8a. This is depicted in two different formats corresponding to prior FIGS. 34 and 33 in the planar arrays 60 of FIGS. 35 and 37. Alternately, in a manner analogous to that depicted in FIGS. 29 and 30, sensors may be bonded to two flexible sheets which serve as carriers, and these sheets may be over-laid and bonded to form an instrumented planar shape sensing tool.

This invention has been built and demonstrated in planar tape form with 8 sensor pairs, each pair collectively measuring bend and twist. Loops in fibers of 0.25 mm diameter were formed and treated for bend sensitivity according to the procedures of U.S. Pat. No. 5,531,257, Patent Cooperation Treaty application PCT/CA94/00314, and the SPIE Article SPIE Vol. 2839, pp. 311–322, 1996). These were affixed in pairs every 5 cm at 45 degrees to the long axis of a latex substrate 0.32 mm thick, 12 mm wide. The light loss portions of the fibers faced way, i.e. were outwardly directed, from the substrate; the apexes of the loops were approximately 1 mm inside the edge of the substrate. Sensors were in pairs, in crossed form, with facing light loss zones so that the sensitized portion of each loop crossed the axial center of the substrate. The leads of the loops were bent and led axially to beyond the end of each substrate with the leads being no closer than 1 mm to the edge.

During the process, fiber leads (38 in FIG. 25) were kept in order in pairs on organizer cards. A fiber from each pair was connected to a light emitting diode (LED) 40. Generally 8 or more fibers 38 can be illuminated by the same LED. The other fiber from each pair was connected to a photodiode 61, one fiber per photodiode. Conventional transimpedance amplifiers 62 converted photodiode current to voltage. These voltages were fed to sum and difference amplifiers 42 (or may be digitized immediately). Analog sums and differences were digitized and fed to a computer 61 for further processing.

Calibration Procedure

The preferred embodiment of the invention consists of pairs of fiber optic sensors operating within ranges for which light intensity throughput of each individual sensor changes linearly with curvature. When the invention is flat (no curvatures are applied), it is desirable to have all of the intensities equal, so that when pair wise sums and differences are taken, all the differences will be the zero, and all the sums will be the same positive value. This reduces computational overhead and ensures minimal interaction between bend and twist outputs.

As a convenient method for adjusting the light intensities use of micro-bend fiber optic "resistors" may be made by sandwiching untreated sections of the fibers between layers of metal and blackened elastomer which are resilient but stiff enough to retain an applied bend. For example, a sandwich is made of the following 4×20 mm layers: black vinyl tape, black double sided adhesive tape, fiber along the 20 mm dimension at the center, black vinyl tape, 0.010" brass. Optical signals may be routed through fibers contained within these sandwiches and bent to adjust the signals to all take on the lowest value, so that all are equal. This adjustment method allows repeated reduction and restitution within broad limits, so that adjustment can be quite precise and forgiving of initial errors.

Once the individual sensor values are equal, then the digitized outputs from the light sensors may be conveyed to a computer. An alternative is to first take sums and differences in analog form, and then send these to a computer. For either case, we may now address the calibration of the values representing bends and twists (or bends, bends and twist, in the computer.

Since the preferred embodiment sensors are linear, the sums and differences will be linear also. In order to calibrate the invention, we need only calibrate at two points of each of the bend and twist ranges. A preferred method of calibrating the invention for bend in its ribbon or tape format is to first lay the tape flat and set all the bend values in the computer to zero. Then the invention can be formed into a hoop on a cylindrical mandrel, and gains (multiplicative positive or negative numbers) can be applied to each bend value until all computer bend values are equal to a constant that corresponds to the uniform curvature seen at the circumference of the mandrel. Since no offsets (added or subtracted values) have been applied, the computer "image" of the tape will contain all zeroes when the tape is again laid flat.

In similar fashion, the twist values may first be set to zero with the tape flat, then gains may be applied when the tape is held straight but has a uniform twist applied over its full length by means of a fixture holding the ends at different angles of rotation about the long axis. An example would be mounting the tape axially in a lathe and rotating the lathe head a known amount.

A preferred method of calibrating both twist and bend simultaneously is to first set bend and twist values to zero while the tape is held flat, then to form the tape in a uniform helix around a cylindrical mandrel. Since a helix has a constant curvature and a constant, distributed twist, gains may be applied to all the bends and separately to all the twists to obtain a computer image of the helix.

The above mandrel-based calibration procedures may be automated in the computer, since all desired bend and twist values are known a priori from the mandrel information, and do not interact. The procedure is simply one of creating a look-up table of gains such that for each bend signal, the bend signal times its assigned gain equals a constant, and a similar procedure of twists.

For sensors that are not linear, a similar procedure may be used, but more than two points will have to be calibrated, requiring more mandrels and more steps.

Accuracy and Precision

Precision (resolution) is defined as what can be resolved over noise, not counting long term drift.

Accuracy is defined as what can be measured to an absolute scale, even in the presence of long term drift.

Precision determined from empirical measurement has been established as being about 1–3 mm per meter of ribbon substrate length. A precision calculation based on 0.02 deg of resolution for each bend sensor and using 20 pairs of sensors at 5 cm spacing on 1 meter of tape provides a worst case value of 0.35 mm, rms=0.09 mm per meter of tape.

Absolute accuracy, influenced mainly by long term drift, was calculated based on an assumption of 1% drift over 2 months, of a standard sensor. For a 1 meter, 20 pair tape, a worst case error of 0.5 cm/month, and rms value of 1.1 mm/month is obtained. In general, the errors will not add. The error contribution to end point position is greater for segments of tape closer to the fixed reference point.

Figure 38:
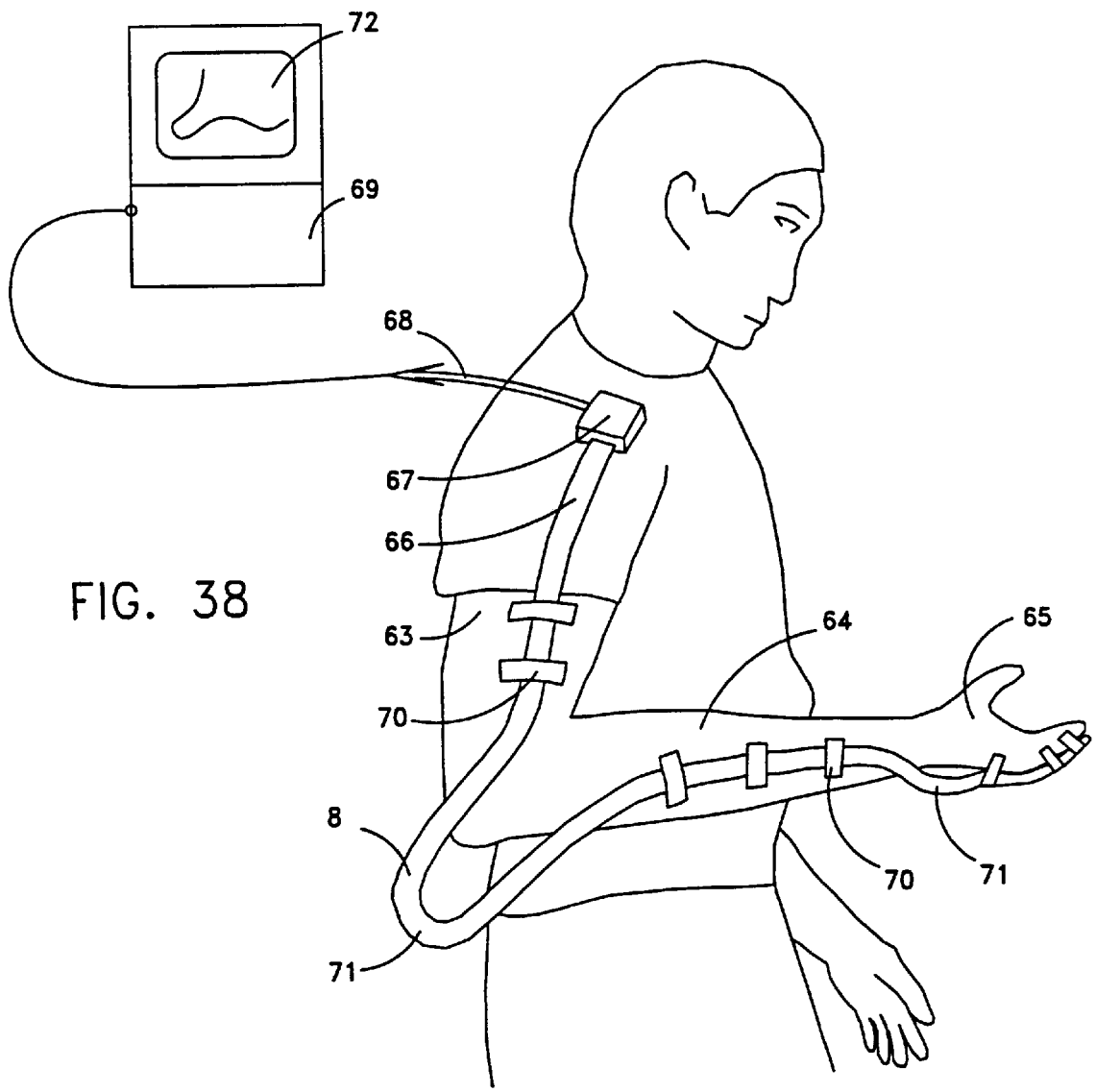
FIG. 38 is a pictorial depiction of a person wearing a ribbon-type sensor to capture motion on a video display.

The invention is depicted in use in a human motion capture application in FIG. 38. A ribbon-type, tape substrate is mounted along the upper arm 63, forearm 64, and hand 65 of a wearer. The sensor leads 66 terminate in a terminal box 67 mounted conveniently on outer clothing which feeds signals 68 to a computer 69. The instrumented tape is affixed to desired body portions by adhesive tape 70. No critical attachment points are dictated by the tape, although computational efficiency may be associated with preferred locations.

While the tape is capable of actually measuring the shape of the surface to which it conforms, e.g. the forearm 64, it may suffice to extract only orientations of the limbs for certain segments of the routing of the tape. At the hands 65, data as to shape as well as orientation may be extracted.

Conveniently, loops 71 may be formed at the elbow and wrists from which no data need be collected, other than the locations of the bounding ends of the shape and orientation measuring portions. These disconnected segments 71 may extend freely into space, fully unconstrained. Advantageously, they provide comfort and mobility to the wearer.

While the terminal box 67 may serve as a reference point for defining position, orientation and shape of measured surfaces in space, any point on the tape can equally serve as the reference point. This may include a bony protrusion on the collar bone or the nape of the neck over which the tape passes. This provides exceptional convenience in motion capture technology since the tape is then referenced to a defined location on the human skeleton.

The output from the computer 69, as with all applications of the invention, can provide a video display 72 of the geometric configuration of the shape measuring tool in space, and of the surface to which it is attached.

Figure 39:
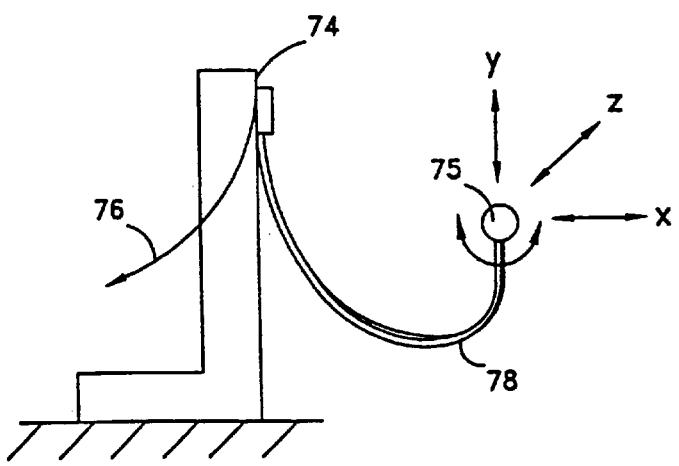
FIG. 39 is a side view of a joystick application of a ribbon-type sensor.

As a last example of the use of the invention, FIG. 39 depicts a planar axial flexure 73 arranged in an arch or sinuous form, supported by a reference 74 surface at one end and terminating at the free end with a body 75 capable of cartesian positioning and orientation x, y, z location and roll, pitch, and yaw orientations. The terminating body 75 may be a knob that serves as a joy-stick to send signals 76 in 6 degrees of freedom to a controlled system, e.g. a robot.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed are as follows:

1. A measuring tool for providing data corresponding to a geometric configuration in space comprising:

(1) a longitudinally extending, flexible substrate having a compliant reference surface and being capable of bending in at least two degrees of freedom so as to be configurable in three dimensional space;

(2) a plurality of spaced bend sensor means and a plurality of spaced twist sensor means each of said plurality of sensor means being respectively coupled to and positioned at specific discrete locations, on and at known respective bend sensor and twist sensor spacing intervals along the longitudinal extent of the substrate to provide flexure signals indicating the respective local state of bend and twist present in the substrate at the respective locations where the respective bend sensor means and twist sensor means are coupled to the substrate; and (3) sensor data processing means coupled to the bend sensor means and twist sensor means for receiving flexure signals therefrom and for presenting data on the geometric configuration of the reference surface of the substrate in three dimensional space, wherein the sensor data processing means operates by determining the geometric configuration of the substrate from bend and twist signals derived from the flexure signals provided by the bend sensor means and twist sensor means at their specific locations and from the spacings intervals for such sensors.

2. A measuring tool as in claim 1 wherein the bend sensor means and twist sensor means are positioned at common, shared bend and twist sensor spacing intervals along the length of the substrate.

3. A measuring tool as in claim 1 wherein the shape of the substrate is in the form of a ribbon having a longitudinal dimension, the substrate being substantially limited to bending along its length about axes which are transverse to the longitudinal dimension of the substrate but being free to twist about such longitudinal dimension.

4. A measuring tool as in claims 1 or 3 wherein the bend sensor means and twist sensor means are provided as pairs of bend sensors co-located at locations along the substrate and respectively positioned to measure bending occurring about respective, splayed intersecting bend axes, the bend and twist signals being respectively provided by additively combining the output of the two co-located bend sensors and by extracting a difference from the output of said two, co-located, bend sensors.

5. A measuring tool as in claims 1 or 3 wherein:
(1) the bend sensor means and twist sensor means comprise optical fibers that have been rendered sensitive to their state of curvature by having treated surface portions of their outer surfaces rendered absorbent to light passing through such fibers;
(2) the fibers have reversing loops and the treated surface portions are located in the region of the loops;
(3) the reversing loops define median lines;
(4) the loops are mounted in pairs along the substrate, to provide a combined bend and twist sensor means within each pair;
and wherein:
(5) the planes of the loops are parallel to the surface of the substrate; and
(6) the median lines of the loops are oriented at splayed angles from each other,
whereby the bend and twist signals are respectively obtained by additively combining the outputs of the loops in each pair and by extracting a difference value from the outputs of the loops in each pair.

6. A measuring tool as in claims 1 or 3 wherein the bend sensor means and twist sensor means comprise optical fibers that have been rendered sensitive to their state of curvature by having treated surface portions of their outer surfaces rendered absorbent to light passing through such fibers.

7. A measuring tool as in claim 6 wherein the optical fibers have reversing loops and the fibers have been rendered sensitive to their state of curvature in the region of the loops to provide said bend sensor means and twist sensor means.

8. A measuring tool as in claim 7 wherein the substrate is a ribbon with a longitudinal dimension, the reversing loops of said twist sensor means define bisecting median lines, the median lines of the loops being aligned with the longitudinal dimension of the ribbon, the loops having surfaces that are disposed parallel to the plane of the substrate and are outwardly directed from the loops, and wherein the treated surface portions on each loop are located on the outwardly directed surfaces of the fiber on only opposite halves and opposite, outwardly-directed surfaces of each such loop.

9. A measuring tool as in claim 7 wherein the loops of the bend sensor means are mounted in nested pairs, the treated surface portions of the fibers in the two loops of each pair being located at complimentary, opposite, outwardly directed face surface portions in each loop, whereby, when the nested loops undergo a common change in bend curvature, the intensity of light passing through the respective loops in each pair changes value in opposite directions.

10. A measuring tool as in claim 9 wherein the difference in outputs of the loops in the nested pair is provided to the sensor data processing means as a measure of bend curvature.

11. A geometric configuration monitoring tool with a configuration monitoring reference surface for measuring the relative location and orientation in three dimensional space of a surface to be measured with respect to a reference location comprising:

(1) a flexible, longitudinally extending substrate capable of flexure in three dimensional space and compliance with the shape of a surface to be measured, said substrate carrying said configuration monitoring reference surface and reference location; and (2) a plurality of bend sensor means and a plurality of twist sensor means serving as angular displacement sensors and respectively spaced at known intervals along the longitudinal extent of said substrate whereby the position and orientation in three dimensional space of said configuration monitoring reference surface with respect to the said reference location is determinable geometrically from the values for angular displacement provided by said angular displacement sensors at their respective locations along said substrate, combined with the values for the intervals separating such sensors, and the spacing of at least one bend sensor means or twist sensor means from the reference location.

12. A tool as in claim 11 wherein said bend sensor means and twist sensor means are interspersed alternately between each other along the longitudinal extent of the substrate.

13. A tool as in claim 11 wherein said bend sensor means and twist sensor means are co-located with each other.

14. A tool as in claim 13 wherein said bend sensor means and twist sensor means comprise two bend sensors positioned to measure bending in splayed directions to provide bend and twist signals derived from the sum and difference in the outputs of said bend sensors.

15. A tool as in claims 11, 12, 13 or 14 wherein said substrate is in the form of a structure of ribbon-like configuration with a longitudinal extent, said ribbon-like structure being free along its length to flex about axes that are transverse to its longitudinal extent but resistant to flexure about axes that are parallel to the longitudinal extent of the ribbon.

16. A tool as in claims 11, 12, 13 or 14 for measuring the relative location and orientation in space of first and second surfaces to be measured with respect to each other, said tool having:

(1) a first portion of the shape monitoring reference surface lying adjacent to a first surface to be measured; and (2) a second portion of the shape monitoring reference surface lying adjacent to a second surface to be measured, wherein the first and second portions of the shape monitoring reference surface bound an intermediate portion of the monitoring tool which is unconstrained in space except at its juncture with said first and second portions of the shape monitoring reference surface.

17. A tool as in claims 11, 12, 13 or 14 wherein said substrate is in the form of a sheet carrying the reference surface and having said bend sensor means and twist sensor means attached thereto.

18. A method of providing data defining the spatial configuration of a path extending in three dimensional space, comprising conforming a substrate in the form of a flexible sheet into a spatial configuration along the path to be defined, providing multiple bend sensor means and multiple twist sensor means attached to said substrate at predetermined intervals along and proximate to the path to be defined, collecting bend signals and twist signals from said respective sensor means, and processing said signals to produce data on the spatial configuration of the path along its extent in three dimensional space, said processing of said signals operating by combining bend signals and twist signals from said bend sensor means and twist sensor means together with the spacing intervals therebetween to produce such data.

19. A method as claimed in claim 18, the substrate being in the form of a ribbon having a longitudinal dimension and substantially limited to bending along its length about axes transverse to the longitudinal dimension, and twisting about its longitudinal dimension.

20. A method as claimed in claims 18 or 19, said sensors comprising optical fibres rendered sensitive to their state of curvature by having treated surface portions of their outer surfaces rendered absorbent for light passing through the fibers.

* * * * *